US008976910B1

(12) United States Patent
Devarasetty

(10) Patent No.: US 8,976,910 B1
(45) Date of Patent: Mar. 10, 2015

(54) METHODS, SYSTEMS, AND COMPUTER READABLE MEDIA FOR SMART DECODING OF DOWNLINK SIGNALS IN THE PRESENCE OF INTERFERENCE CAUSED BY REFERENCE SIGNALS OF DIFFERENT GENERATION AIR INTERFACE EQUIPMENT

(71) Applicant: Ixia, Calabasas, CA (US)

(72) Inventor: Prasada Rao Devarasetty, Cary, NC (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 13/910,089

(22) Filed: Jun. 4, 2013

Related U.S. Application Data

(60) Provisional application No. 61/820,652, filed on May 7, 2013.

(51) Int. Cl.
*H04L 27/06* (2006.01)
*H04B 1/12* (2006.01)

(52) U.S. Cl.
CPC ...................... *H04B 1/123* (2013.01)
USPC ........................................................ 375/341

(58) Field of Classification Search
USPC ................................................. 375/262, 341
See application file for complete search history.

(56) References Cited

U.S. PATENT DOCUMENTS

| | | | | |
|---|---|---|---|---|
| 2002/0167993 | A1* | 11/2002 | Shinoi | 375/147 |
| 2005/0180517 | A1* | 8/2005 | Abe | 375/260 |
| 2011/0239095 | A1* | 9/2011 | Tomono et al. | 714/791 |
| 2013/0177064 | A1* | 7/2013 | Ido et al. | 375/232 |

OTHER PUBLICATIONS

"Viterbi Decoding of Convolutional Codes, Lecture 9," MIT 6.02 Draft Lecture Notes, pp. 1-11 (Oct. 6, 2010).
"Viterbi Algorithm for Decoding of Convolutional Codes," 1-Core Technologies, pp. 1-8 (Nov. 14, 2008).
Declaration By Inventor dated Oct. 6, 2014 for U.S. Appl. No. 13/910,089.

* cited by examiner

*Primary Examiner* — Don N Vo
(74) *Attorney, Agent, or Firm* — Jenkins, Wilson, Taylor & Hunt, P.A.

(57) ABSTRACT

The subject matter described herein relates to methods, systems, and computer readable media for smart decoding of downlink signals in the presence of interference caused by reference signals of different generation air interface equipment. One method includes receiving, at a decoder, a downlink signal including interference caused by different generation network equipment. The method further includes providing information regarding reference signal locations to the decoder. The method further includes, at the decoder, weighting decoding error metrics resulting from received bits corresponding to the reference signal locations relative to decoding error metrics resulting from received bits corresponding to other locations to account for the presence of the interference caused by the reference signals. The method further includes decoding the received bits based on the relative weights and outputting a sequence of likely transmitted bits.

19 Claims, 6 Drawing Sheets

METHODS, SYSTEMS, AND COMPUTER READABLE MEDIA FOR SMART DECODING OF DOWNLINK SIGNALS IN THE PRESENCE OF INTERFERENCE CAUSED BY REFERENCE SIGNALS OF DIFFERENT GENERATION AIR INTERFACE EQUIPMENT

PRIORITY CLAIM

This application claims the benefit of U.S. Provisional Patent Application Ser. No. 61/820,652 filed May 7, 2013, the disclosure of which is incorporated herein by reference in its entirety.

TECHNICAL FIELD

The subject matter described herein relates to decoding downlink signals. More particularly, the subject matter described herein relates to methods, systems, and computer readable media for smart decoding of downlink signals in the presence of interference caused by reference signals of different generation air interface equipment.

BACKGROUND

In wireless communications networks, downlink signals are encoded using forward error correcting codes to allow correction of bit errors by the receiving network equipment. Two common types of forward error correction encoding used in long term evolution (LTE) and LTE advanced networks are convolutional encoding and Turbo encoding. A convolutional decoder receives downlink signals and uses the error correcting code to identify the most likely combination of transmitted bits based on the received bits.

Interference in the received signal can lead to bit errors. One possible cause of interference in downlink signals occurs in networks that support both legacy LTE and LTE advanced user equipment. LTE advanced is supposed to be backwards compatible with legacy LTE equipment. However, LTE advanced equipment introduces new reference signals for the purposes of Channel State Information (CSI) and positioning. These reference signals are transmitted in particular resource elements in particular subframes depending on configuration. LTE advanced user equipment (UE) understands and properly decodes these reference signals. However, legacy UEs will experience interference due to the reference signals introduced on LTE advanced because different antenna ports of the e-Node B transmitting data and reference signals to the legacy UEs which may use the same resource elements used by other antennas for the reference signals. When the same resource element is used for a reference signal and data is received by a legacy UE, the presence of the reference signal may cause interference and possibly bit errors in the decoding of the data by the legacy UE because the legacy UE has no knowledge of the reference signal or the data that was transmitted.

One possible solution to the problem of interference caused by reference signals is to lower the modulation and coding scheme (MCS) index, which lowers the number of bits transmitted per symbol and thus lowers the data rate. For example, the MCS index may be changed from MCS 23, which corresponds to 64 quadrature amplitude modulation (QAM) encoding, to MCS 12, which corresponds to 16 QAM encoding. Lowering the MCS index decreases the likelihood of bit errors because lower coding and the space between symbols in the signal constellation is increased. However, lowering the MCS index decreases the data throughput provided to the legacy UEs. Lowering the throughput data throughput is undesirable as it decreases the quality of service experienced by users.

In addition to being a problem for legacy UEs that operate in networks with advanced network equipment, interference caused by the reference signals is also a problem for network equipment test systems that emulate legacy and advanced network equipment. It is often desirable for UE emulators to emulate as many UEs as possible to test the performance of access network equipment, such as evolved node Bs (e-Node Bs). If the coding rate is slowed because of bit errors experienced by emulated legacy UEs caused by interference from reference signals transmitted to real or emulated LTE advanced user equipment, the number of UEs that can be emulated and the total system throughput may be adversely affected. Even if a single legacy LTE UE is being emulated in a test, the data rate to that UE can be slowed if bit errors caused by interference from LTE advanced reference signals occur.

Accordingly, in light of these difficulties, there exists a need for methods, systems, and computer readable media for smart decoding of downlink signals in the presence of interference caused by reference signals of different generation network equipment.

SUMMARY

The subject matter described herein relates to methods, systems, and computer readable media for smart decoding of downlink signals in the presence of interference caused by reference signals of different generation air interference equipment. One method includes receiving, at a decoder, a downlink signal including interference caused by reference signals of different generation air interference equipment. The method further includes providing information regarding reference signal locations to the decoder. The method further includes, at the decoder, weighting decoding error metrics resulting from received bits corresponding to the reference signal locations relative to decoding error metrics resulting from received bits corresponding to other locations to account for the presence of the interference caused by the reference signals. The method further includes decoding the received bits based on the relative weights and outputting a sequence of likely transmitted bits.

The subject matter described herein for smart decoding of downlink signals in the presence of interference caused by reference signals of different generation network equipment may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
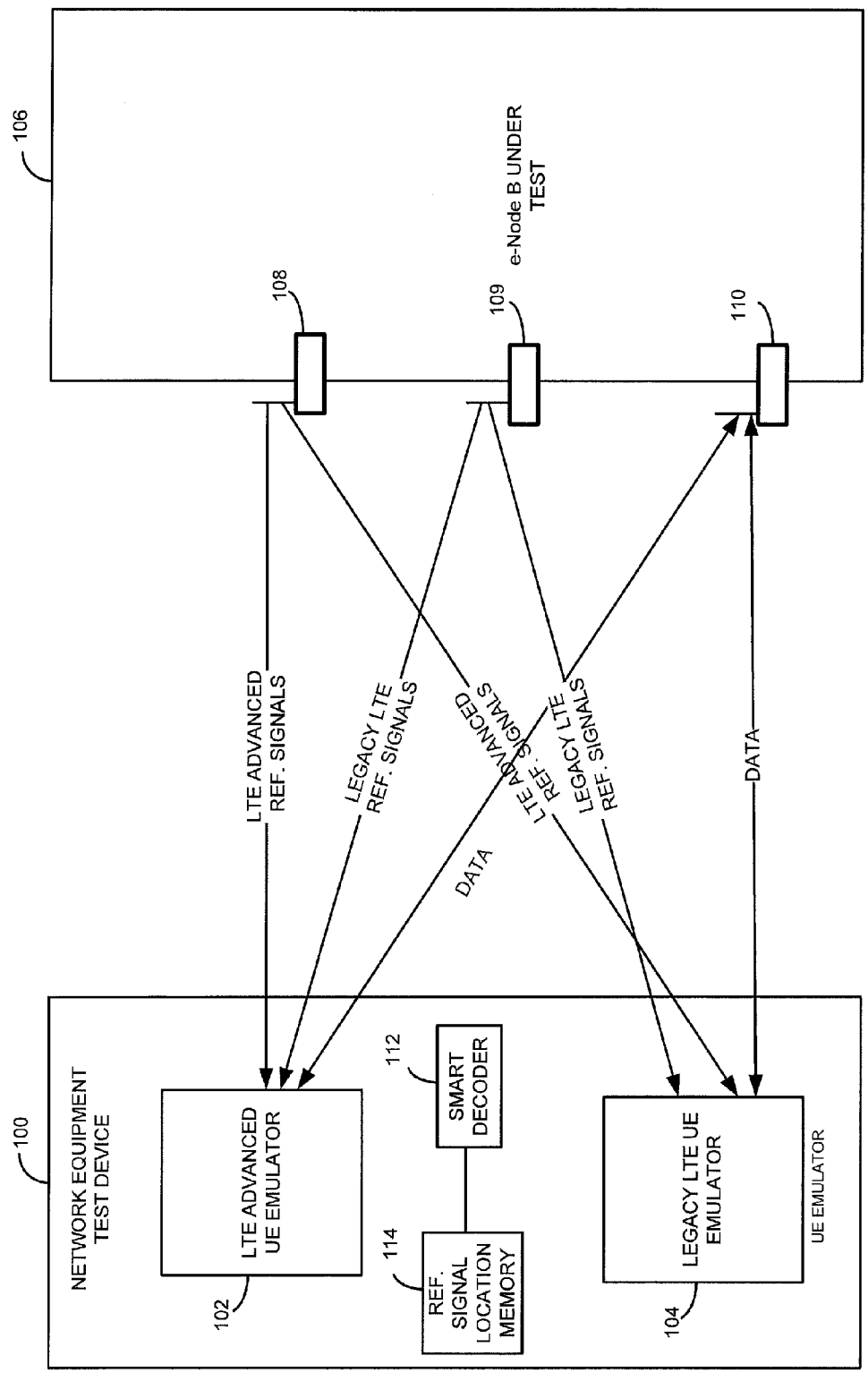
FIG. 1 is a network diagram illustrating a network equipment test system including a decoder for smart decoding of downlink signals in the presence of interference caused by reference signals of different generation air interference equipment according to an embodiment of the subject matter described herein.

The subject matter described herein includes methods, systems, and computer readable media for smart decoding of downlink signals in the presence of interference caused by reference signals of different generation air interference equipment. FIG. 1 is a network diagram illustrating a network equipment test system including a smart decoder according to an embodiment of the subject matter described herein. Referring to FIG. 1, a network device test system 100 includes an LTE advanced UE emulator 102 for emulating LTE advanced UEs and a legacy LTE UE emulator 104 for emulating legacy UEs to test a device under test, which in the illustrated embodiment is an e-Node B 106. LTE advanced UE emulator 102 and legacy LTE UE emulator 104 may be configured to receive signals from e-Node B 106 to test the functionality of e-Node B 106. E-Node B 106 may transmit downlink signals to LTE advanced UE emulator 102 and legacy UE emulator 104. For the LTE advanced downlink signals, reference signals for positioning and CSI, which are cell specific and not UE specific, may be transmitted regularly in specific resource element locations. In the illustrated example, LTE advanced reference signals are transmitted by a first antenna 108 of e-Node B 106. The LTE advanced reference signals are received by LTE advanced UE emulator 102 and legacy LTE UE emulator 104 because the emulators are operating in the same cell. E-Node B 106 may also transmit downlink data to legacy LTE UE emulator 104 and to LTE advanced UE emulator 102 via another antenna 110 of e-Node B 106. Another antenna 109 may transmit legacy LTE reference signals to all terminals in the emulated cell. The legacy LTE reference signals do not adversely affect real or emulated LTE advanced UEs because LTE advanced UEs are backward compatible with legacy LTE protocols. However, the LTE advanced reference signals may cause interference to real or emulated legacy UEs because the legacy LTE terminals are not forward compatible with the LTE advanced protocol, and transmissions of LTE advanced reference signals may overlap in time and frequency with transmissions of legacy LTE data. For example, if the transmission of LTE data overlaps in time and frequency with the transmission of LTE data, the data detected by legacy LTE UE emulator 104 will be corrupted due to interference in the resource block locations corresponding to the LTE advanced reference signals.

Figure 2:
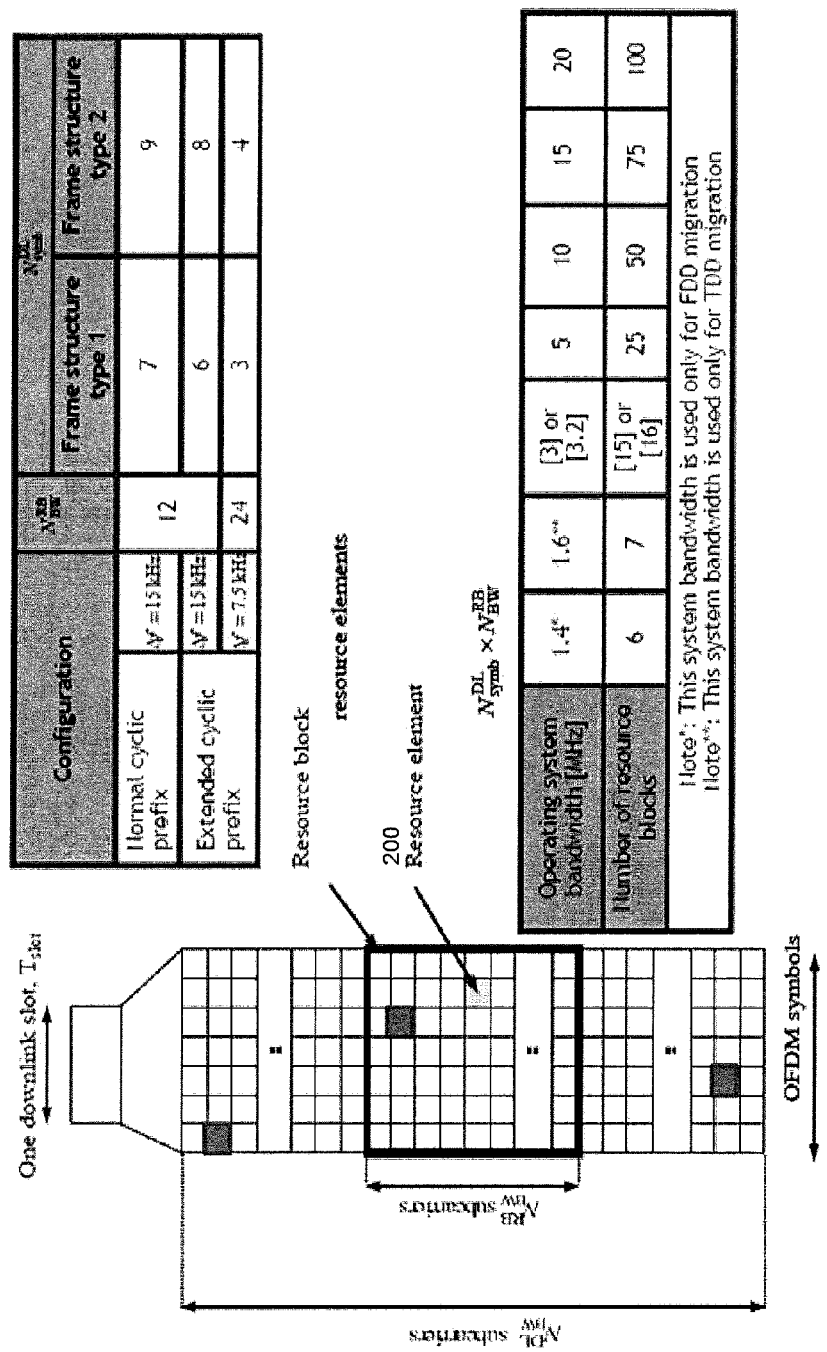
FIG. 2 is a block diagram illustrating a downlink resource map illustrating interference caused by reference signals of different generation air interference equipment according to an embodiment of the subject matter described herein.

FIG. 2 illustrates this problem in more detail. In FIG. 2, a resource block structure for LTE or LTE advanced communications is illustrated. In the structure, the group of 7 columns corresponds to a downlink timeslot. Each column corresponds to one downlink (DL) orthogonal frequency division multiplexing (OFDM) symbol. Each row corresponds to a different subcarrier. Each cell corresponds to a resource element, which may carry data, reference signals, or other control information. In the illustrated example, it is assumed that resource element 200 is used by antenna 108 to transmit an LTE Advanced downlink reference signal and that the same resource element 200 is used by antenna 110 to transmit data to legacy LTE UE emulator 104. As a result, the data transmitted to legacy LTE UE emulator 104 in resource element 200 will have interference caused by the LTE advanced reference signals which are meant for LTE advanced UEs only.

Returning to FIG. 1, to mitigate the effects of such interference, network device test system 100 may include a smart decoder 112 that is preconfigured with data stored in reference signal location memory that indicates the locations of reference signals transmitted by different generation network equipment. For example, reference signal location memory 114 may store the location of resource element 200 and any other reoccurring resource element that carries LTE advanced downlink reference signals. Smart decoder 112, when decoding the data, may use the known resource element locations to identify bits corresponding to such locations as corrupt. During decoding, smart decoder 112 may weight decoding error metrics resulting from such bits relative to decoding error metrics resulting from bits corresponding to other locations to account for the interference. For example, smart decoder 112 may discard computed error metrics corresponding to reference signal locations, weight error metrics resulting from such bits lower than the error metric corresponding to other bits, etc. An exemplary decoding scheme illustrating the weighting of decoding error metrics resulting from bits corresponding to reference signal locations will be described in more detail below.

Figure 3:
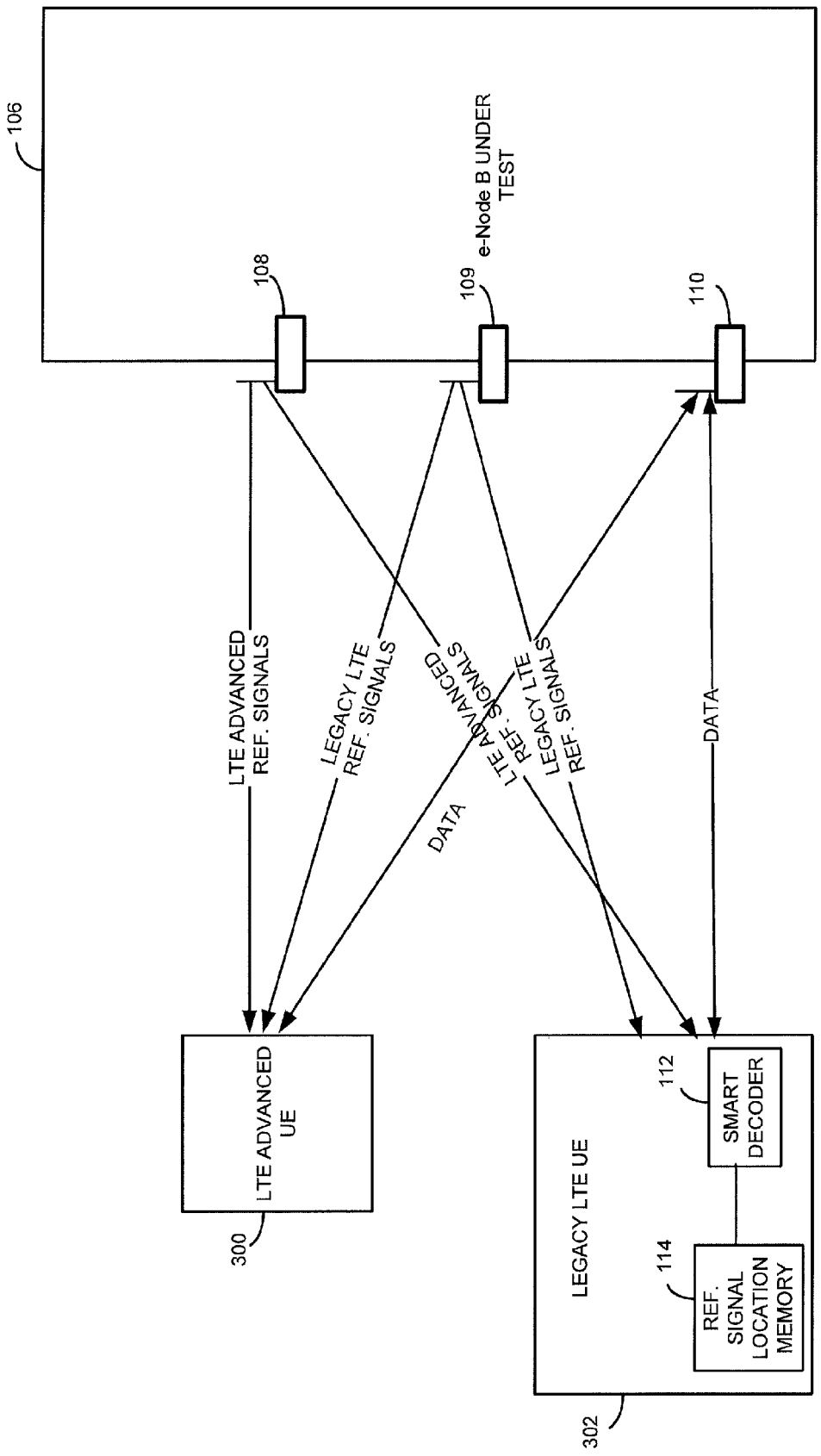
FIG. 3 is a network diagram illustrating user equipment having a decoder for smart decoding of downlink signals in the presence of interference caused by reference signals of different generation air interference equipment according to an embodiment of the subject matter described herein.

As stated above, the problem of interference in downlink data from LTE advanced reference signals is not limited to test systems. Such interference may also occur between real non-emulated UEs that are of different generations. FIG. 3 illustrates this problem. In FIG. 3, LTE advanced UE 300 transmits uplink data to e-Node B 106 and receives downlink data and reference signals. Legacy LTE UE 302 also transmits uplink data to e-Node B 106. However, the downlink data transmitted to legacy LTE UE 302 may include interference caused by LTE advanced reference signals intended for LTE UE 300. Accordingly, legacy LTE UE 302 may include smart decoder 112 and reference signal location memory 114 as described above. As such, legacy LTE UE 302 may weight bit error metrics corresponding to reference signal locations for different generation network equipment relative to bit error metrics corresponding to non-reference signal locations to account for the interference.

Figure 4A:
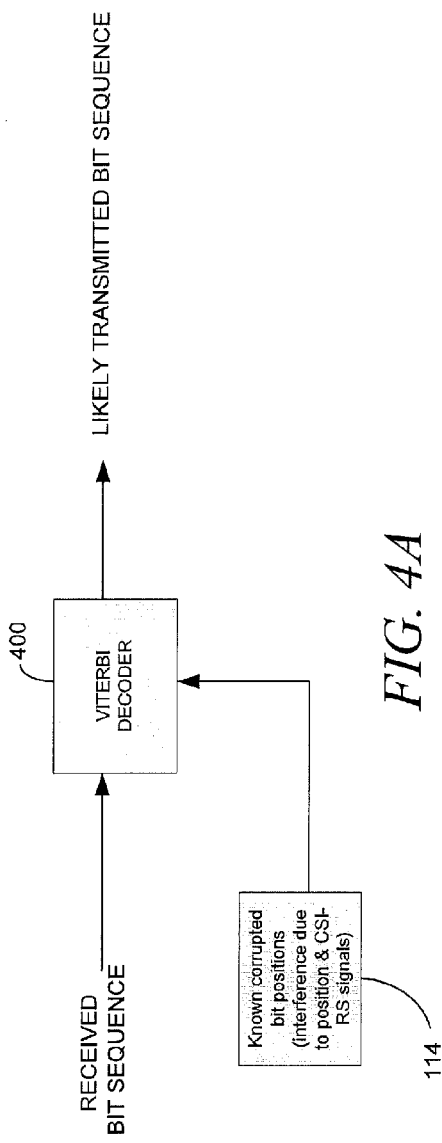
FIGS. 4A and 4B are block diagrams of exemplary decoder architectures for smart decoding of downlink signals in the presence of interference caused by reference signals of different generation air interference equipment according to an embodiment of the subject matter described herein.
Figure 4B:
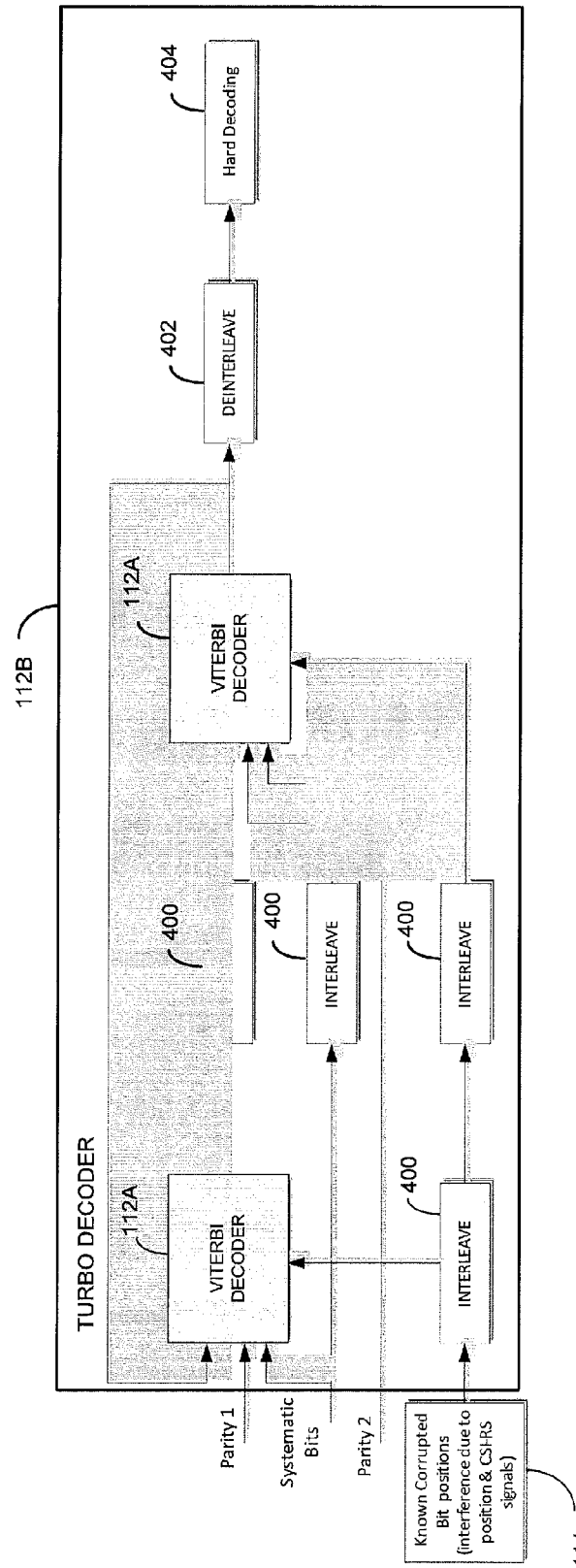

FIGS. 4A and 4B illustrate smart decoders according to embodiments of the subject matter described herein. More particularly, FIG. 4A illustrates a Viterbi decoder 112A and FIG. 4B illustrates a Turbo decoder 112B that utilize known corrupted bit positions corresponding to interference caused by reference signal locations according to embodiments of the subject matter described herein. Referring to FIG. 4A, Viterbi decoder 112A receives known corrupted bit positions from reference signal location memory 114. Viterbi decoder 112A weights decoding error metrics resulting from bits corresponding to the reference signal locations relative to decoding error metrics resulting from bits corresponding to non-reference signal locations, sums the error metrics for each possible transmitted bit sequence, and outputs the bit sequence with the lowest accumulated error metric as the most likely sequence of transmitted bits. In FIG. 4B, Turbo decoder 112B includes two Viterbi decoders 112A, interleavers 400, deinterleaver 402, and hard decision decoder 404. Like Viterbi decoder 112A illustrated in FIG. 4A, Viterbi decoders 112A illustrated in FIG. 4B receive known corrupted bit positions of interference-causing LTE advanced reference signals from reference signal location memory 114. Viterbi decoders 112A utilize such information to weight bit error metrics resulting from reference signal locations relative to bit error metrics resulting from non-reference-signal locations to account for the error. As a result, the interference caused by LTE advanced reference signals has a reduced effect on the most likely sequence of bits output by Turbo decoder 112B without requiring that the MCS index be reduced.

Figure 5:
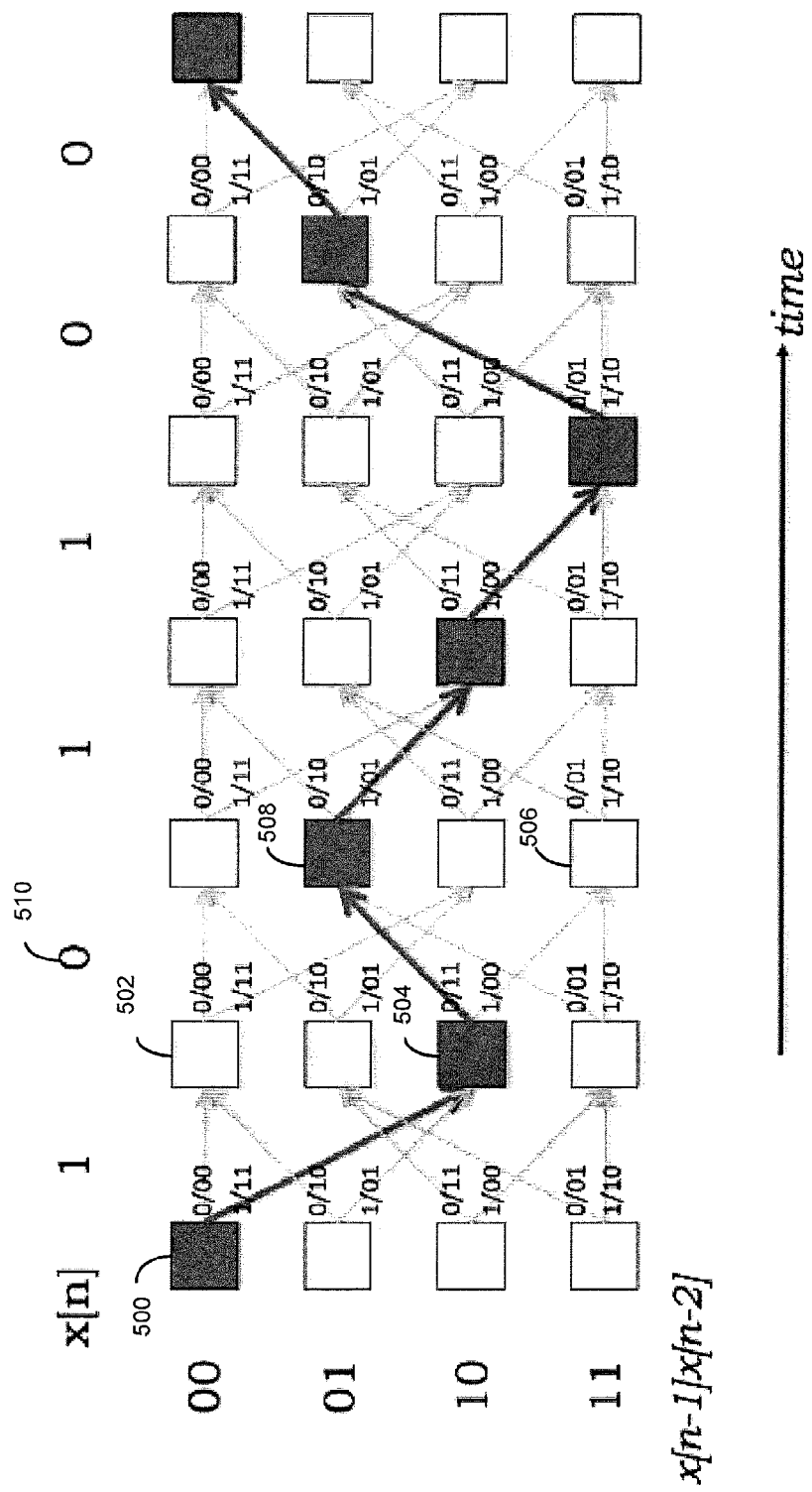
FIG. 5 is a trellis diagram illustrating exemplary weighting of bits corresponding to known reference signal locations by a smart decoder according to an embodiment of the subject matter described herein.

FIG. 5 illustrates exemplary weightings that may be implemented by Viterbi decoder 112A according to an embodiment of the subject matter described herein. Referring to FIG. 5, a decoding trellis that may be implemented by Viterbi decoder 112A is illustrated. In the decoding trellis, each path corresponds to a possible transmitted bit sequence. Each block corresponds to a state. The bits at the top of the diagram correspond to the received bit sequence x[n]. The cost of moving from one state to the next in a path is referred to as an error. For a given state transition, the error metric is represented by the difference or distance between the received bit and the bit that was expected to be received. For example, if the received bit is a 1 and the expected bit for a given state transition is 0, then the error metric for the transition is set to 1. The total error metric moving from the left hand side of the trellis to the right hand side of the trellis is accumulated for each path. The path with the lowest accumulated error metric is selected as the most likely path and the most likely transmitted message.

To illustrate an example, in state 500, the accumulated error metric is assumed to be zero. There are two possible paths from state 500, one resulting in a transition to state 502 and the other resulting in a transition to state 504. The error metric in transitioning to state 502 is 1 because the expected received bit to transition from state 500 to state 502 is 0 (represented by the numerator on the transition error) and the actual received bit is 1. The error metric in moving from state 500 to state 504 is 0 because the expected bit and the received bit are both 1.

From state 504, it is possible to go to states 506 or 508. The error metric in transitioning from state 504 to 508 is 0 because received bit 510 matches the expected bit associated with the transition from 504 to 508. The error metric in transitioning from 504 to 506 is 1 because the expected bit is 1 and the received bit is a zero. The total accumulated error metric for the transition from state 500 to 504 to 508 is 1+0=1. The error calculation and accumulation process is repeated for each possible path in FIG. 5. The path with the lowest accumulated error metric (also referred to as the path metric) is selected as the most likely path, and the corresponding bit sequence is selected as the most likely transmitted bit sequence.

In order to mitigate the effects of bit errors caused by interfering reference signals, Viterbi decoder 112A may discard or ignore bit errors corresponding to reference signal locations. For example, if bit 510 illustrated in FIG. 5 is known to correspond to a reference signal location, error metrics that would result from any of the state transitions in the same column as bit 510 may be ignored. For example, when transitioning from state 504 to 506, the error metric introduced by this transition would be counted as 0, even though distance exists between the expected bit (1) and the received bit (0) corresponding to the transition. In another example, error metrics resulting from bits corresponding to reference signal locations may be weighted lower than error metrics resulting from bits corresponding to other locations so that the effect of the reference signals on the accumulated error metric is reduced. For example, the error metric resulting from bit 510 may be weighted to one half of the error metric resulting from other transitions corresponding to non-reference signal locations. As a result, any path that includes bit 510 would have an accumulated error that is lower than if error metric for bit 510 did not have a reduced weighting.

Figure 6:
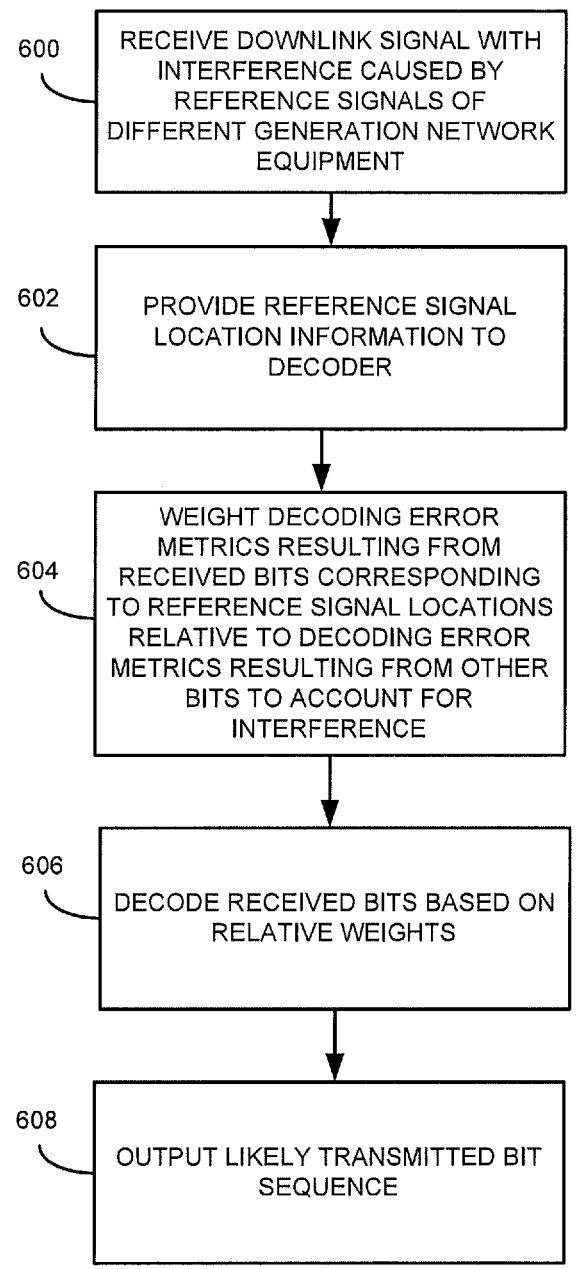
FIG. 6 is a flow chart illustrating a process for smart decoding of downlink signals in the presence of interference caused by reference signals of different generation air interference equipment according to an embodiment of the subject matter described herein.

FIG. 6 is a flow chart illustrating exemplary overall steps for smart decoding of downlink signals in the presence of interference caused by different generation air interface equipment according to an embodiment of the subject matter described herein. Referring to FIG. 6, in step 600, a decoder receives a downlink signal including interference caused by reference signals of different generation network air interface equipment. Referring to FIG. 1, smart decoder 112 may receive legacy LTE downlink signals corrupted by reference signals transmitted by e-Node B 106 to emulated LTE advanced user equipment. Similarly, as illustrated in FIG. 3, decoder 112 may receive legacy LTE downlink signals corrupted by reference signals intended for LTE advanced user equipment. In step 602, information regarding reference signal locations is provided to the decoder. For example, smart decoder 112 may receive, from reference signal location memory 114, the bit positions in corresponding to LTE advanced reference signal locations. As used herein, the term "reference signal" is intended to refer to any type of signal transmitted by one generation of air interface equipment that is not used by another generation of air interface equipment and that can be transmitted in the same resource element as data or control information for the generation of network equipment that does not use the reference signal. In step 604, the decoder weights decoding error metrics resulting from received bits corresponding to the reference signal locations relative to decoding error metrics resulting from received bits corresponding to other locations to account for the presence of interference caused by the reference signals. For example, decoder 112 may ignore error metrics corresponding to reference signal locations (equivalent to assigning a zero error metric to such bits), or weight decoding error metrics resulting from such bits such that they have a smaller effect on accumulated error metrics during the decoding process than decoding error metrics resulting from other bits. In step 606, the decoder decodes the received bits based on the relative weights and, in step 608, outputs a sequence of likely transmitted bits. As stated above, the transmitted bits corresponding to the lowest accumulated error metrics may be identified as the most likely sequence of transmitted bits. Error metrics resulting from reference signal locations may be discarded or weighted lower than others to reduce their effect on the accumulated error.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for smart decoding of downlink signals in the presence of interference caused by reference signals of different generation air interface equipment, the method comprising:
   receiving, at a decoder, a downlink signal including interference caused by reference signals of different generation air interface equipment;
   providing information regarding reference signal locations to the decoder;
   at the decoder, weighting decoding error metrics resulting from received bits corresponding to the reference signal locations relative to decoding error metrics resulting from received bits corresponding to other locations to account for the presence of the interference caused by the reference signals; and
   decoding the received bits based on the relative weights and outputting a sequence of likely transmitted bits.

2. The method of claim 1 wherein the decoder is a component of a user equipment (UE) emulator.

3. The method of claim 1 wherein the decoder is a component of a user equipment (UE).

4. The method of claim 1 wherein the decoder comprises a forward error correcting decoder.

5. The method of claim 4 wherein the forward error correcting decoder comprises a Viterbi decoder or a Turbo decoder.

6. The method of claim 1 wherein the downlink signal comprises a long term evolution (LTE) downlink signal with interference caused by LTE advanced reference signals.

7. The method of claim 1 wherein providing information regarding the reference signal locations includes informing the decoder of downlink resource elements used to transmit the reference signals.

8. The method of claim 1 wherein weighting decoding error metrics resulting from received bits corresponding to the reference signal locations relative to decoding error metrics resulting from received bits corresponding to other locations to account for the interference includes ignoring decoding error metrics resulting from the reference signal locations.

9. The method of claim 1 wherein weighting decoding error metrics resulting from received bits corresponding to the reference signal locations relative to decoding error metrics resulting from received bits corresponding to other locations to account for the interference includes weighting decoding error metrics resulting from the received bits corresponding to the reference signal locations lower than decoding error metrics resulting from non-reference-signal received bit locations.

10. A system for smart decoding of downlink signals in the presence of interference caused by reference signals of different generation air interface equipment, the system comprising:
    a decoder configured to receive a downlink signal including interference caused by reference signals of different generation air interference equipment;
    a reference signal location memory operatively associated for providing information regarding reference signal locations to the decoder; and
    wherein the decoder is configured to weight decoding error metrics resulting from received bits corresponding to the reference signal locations relative to decoding error metrics resulting from received bits corresponding to other locations to account for the presence of the interference caused by the reference signals, to decode the received bits based on the relative weights and to output a sequence of likely transmitted bits.

11. The system of claim 10 wherein the decoder is a component of a user equipment (UE) emulator.

12. The system of claim 10 wherein the decoder is a component of a user equipment (UE).

13. The system of claim 10 the decoder comprises a forward error correcting (FEC) decoder.

14. The system of claim 13 wherein the FEC decoder comprises a Viterbi decoder or a Turbo decoder.

15. The system of claim 10 wherein the downlink signal comprises a long term evolution (LTE) downlink signal with interference caused by LTE advanced reference signals.

16. The system of claim 10 wherein the reference signal location memory is configured to store locations of downlink resource elements used to transmit the reference signals.

17. The system of claim 10 wherein the decoder is configured to ignore decoding error metrics resulting from the reference signals.

18. The system of claim 10 wherein the decoder is configured to weight decoding error metrics resulting from received bits corresponding to the reference signal locations lower than decoding error metrics resulting from received bits corresponding to non-reference-signal locations.

19. A non-transitory computer readable medium having stored thereon executable instructions that when executed by the processor of a computer control the computer to perform steps comprising:
    receiving, at a decoder, a downlink signal including interference caused by reference signals of different generation air interference equipment;
    providing information regarding reference signal locations to the decoder;
    at the decoder, weighting decoding error metrics resulting from received bits corresponding to the reference signal locations relative to decoding error metrics resulting from received bits corresponding to other locations to account for the presence of the interference caused by the reference signals; and
    decoding the received bits based on the relative weights and outputting a sequence of likely transmitted bits.

* * * * *